W. H. CONE.
PROCESS OF ELECTRICALLY DECOMPOSING FLUIDS.
APPLICATION FILED MAR. 16, 1910.
1,011,413.
Patented Dec. 12, 1911.
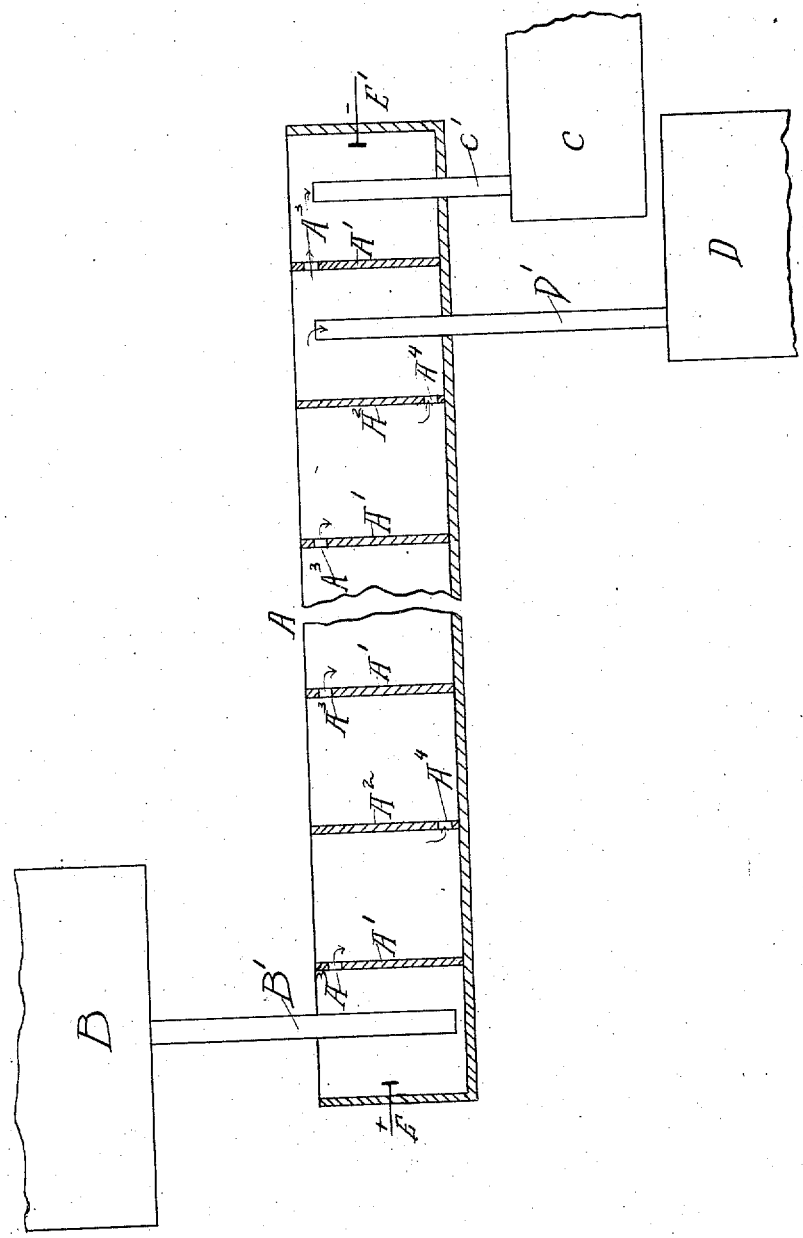

UNITED STATES PATENT OFFICE.

WILLIAM H. CONE, OF CHICAGO, ILLINOIS, ASSIGNOR TO LAURA G. FIXEN, OF CHICAGO, ILLINOIS.

PROCESS OF ELECTRICALLY DECOMPOSING FLUIDS.

1,011,413.   Specification of Letters Patent.   Patented Dec. 12, 1911.

Application filed March 16, 1910. Serial No. 549,581.

*To all whom it may concern:*

Be it known that I, WILLIAM H. CONE, a citizen of the United States, residing at Chicago, in the county of Cook and State of Illinois, have invented a certain new and useful Improvement in Processes of Electrically Decomposing Fluids, of which the following is a specification.

My invention relates to a process by which liquids may be decomposed into some of their chemical constituents and the latter be withdrawn in solution or otherwise separately. It is illustrated in one of its applications in connection with the separation of chlorin and sodium from sodium chlorid and I shall describe the process and illustrate the same as applied to this particular use.

The accompanying drawing presents a diagrammatic illustration of one form of apparatus which may be used for my purpose, wherein A is a closed tank containing the baffle plates $A^1$, $A^2$, the plates $A^1$ having near their tops the openings $A^3$, while the plates $A^2$ have near their bottoms the openings $A^4$. The tank B communicates by means of the pipe $B^1$ with one end of the tank A, while tanks D and C communicate with the other end of tank A by means of the pipes $D^1$ and $C^1$ opening into adjacent chambers formed by the baffle plates. The anode E and cathode $E^1$ are located respectively at opposite ends of the tank.

The use and operation of my invention are as follows:

The tank B, being filled with a solution of sodium chlorid, is allowed to overflow by means of the pipe $B^1$ into the tank A. The liquid fills successive chambers in the tank until the tank is completely filled and a current sets in in the direction of the arrows, the liquid being carried off into the tanks C and D. Electric current from any suitable source is passed through the tank from the anode E to the cathode $E^1$ in the direction of the flow of the liquid and liberates at the anode and cathode respectively free chlorin and free sodium. The chlorin immediately goes into solution in the water of the mixture, thus producing chlorin water. The sodium also combines with the water in the chamber which contains the cathode and is carried off to the tank C. The chlorin water is carried off through the pipe $D^1$ to the tank D. When chlorin and sodium are liberated by electrolysis in a solution of water there is a strong tendency for the chlorin and sodium to again unite, forming sodium chlorid. This is prevented by having two exits for the liquid, one immediately adjacent the cathode where the sodium is liberated, the other intermediate said first exit and the anode where the chlorin is liberated. Thus the liquid traveling through the tank A in the direction of the cathode is enabled to leave said tank carrying chlorin in solution before having reached the point where sodium is being liberated. Some of the chlorin water is allowed to pass over into the sodium chamber, there uniting with the sodium to form sodium hypochlorite. The rest of the chlorin water will then pass out free from sodium, thus producing in the receiving tank D a solution of chlorin. The baffle plates are interposed in the tank in order to retard the flow of liquid and give a longer path and one having a greater resistance to the flow of the solution thus decreasing the rate of flow and giving opportunity for a more complete electrolytic action at the electrodes. The baffle plates near the cathode are intended also to prevent to as great an extent as possible the mingling of the water carrying sodium with the water carrying chlorin.

I claim:

1. The process of decomposing liquids which consists in passing a current of electricity through and in the same direction with a stream thereof, and withdrawing the decomposed products from such stream at different points therealong.

2. The process of decomposing a solution of sodium chlorid which consists in passing a current of electricity through and in the same direction with a stream thereof, and withdrawing the decomposed products from such stream at different points therealong.

3. The process of decomposing a solution of sodium chlorid which consists in passing a current of electricity through and in the same direction with a stream thereof, and withdrawing the chlorin compounds and the sodium compounds from such stream at different points therealong.

4. The process of decomposing liquids which consists in passing a current of electricity through and in the same direction with a stream thereof, and withdrawing the decomposed products from such stream at different points therealong near the cathode end.

5. The process of decomposing a solution of sodium chlorid which consists in passing a current of electricity through and in the same direction with a stream thereof, and withdrawing the decomposed products from such stream at different points therealong near the cathode end.

6. The process of decomposing a solution of sodium chlorid which consists in passing a current of electricity through and in the same direction with a stream thereof, and withdrawing the chlorin compounds and the sodium compounds from such stream at different points therealong near the cathode end.

7. The process of decomposing liquids which consists in passing a current of electricity through and in the same direction with a retarded stream thereof, and withdrawing the decomposed product from such stream at different points therealong.

8. The process of decomposing a solution of sodium chlorid which consists in passing a current of electricity through and in the same direction with a retarded stream thereof, and withdrawing the decomposed products from such stream at different points therealong.

9. The process of decomposing a solution of sodium chlorid which consists in passing a current of electricity through and in the same direction with a retarded stream thereof, and withdrawing the chlorin compounds and the sodium compounds from such stream at different points therealong.

10. The process of decomposing liquids which consists in passing a current of electricity through and in the same direction with a retarded stream thereof, and withdrawing the decomposed products from such stream at different points therealong near the cathode end.

11. The process of decomposing solution of sodium chlorid which consists in passing a current of electricity through and in the same direction with a retarded stream thereof, and withdrawing the decomposed products from such stream at different points therealong near the cathode end.

12. The process of decomposing a solution of sodium chlorid which consists in passing a current of electricity through and in the same direction with a retarded stream thereof, and withdrawing the chlorin compounds and the sodium compounds from such stream at different points therealong near the cathode end.

13. The process of decomposing liquids which consists in passing currents of electricity through and in the same direction as the stream of material between electrodes located near either end of said stream, and dividing the stream near one of said electrodes in such manner that the decomposed products are separately carried away.

14. The process of decomposing liquids which consists in providing a cell having an electrode at each end thereof and then passing a stream of the liquid through said cell and then removing liquid from the cell at two separated points, both of said points located between said electrodes.

Signed at Chicago, Illinois, this 28th day of February, A. D. 1910.

WILLIAM H. CONE.

Witnesses:
 EDNA K. REYNOLDS,
 DONALD M. CARTER.